United States Patent Office 3,549,729
Patented Dec. 22, 1970

3,549,729
SULFONATED ARYL PROSPHATES AND PROCESS FOR MAKING SAME
Joseph Di Pietro, West Millington, and Merrill N. O'Brien, Jr., New Providence, N.J., assignors to Celanese Corporation, New York, N.Y., a corporation of Delaware
No Drawing. Continuation of application Ser. No. 468,612, June 30, 1965. This application Jan. 10, 1969, Ser. No. 791,879
Int. Cl. C07f 9/12; C08f 45/58
U.S. Cl. 260—947     12 Claims

ABSTRACT OF THE DISCLOSURE

Sulfonated aryl phosphates and a process of preparing sulfonated aryl phosphates and alkali metal salts thereof comprising contacting an aryl phosphate with a solution of sulfur trioxide in an inert solvent. The sulfonated aryl phosphates are useful for improving the dyeability of shaped articles, such as filaments prepared from organic polymers.

---

This application is a continuation of U.S. application Ser. No. 468,612, filed June 30, 1965, now abandoned.

This invention relates to a new class of compounds, i.e., sulfonated aryl phosphates, and a method for producing them.

The most commonly used method for the sulfonation of aromatic compounds is contact with concentrated or fuming sulfuric acid for a prescribed period of time. While this method is satisfactory for the sulfonation of unsubstituted aromatic hydrocarbons, it cannot be applied to phenolic esters such as aryl phosphates since it results in hydrolysis of the ester linkages.

In accordance with one aspect of the invention, a new class of compounds, i.e., sulfonated aryl phosphates, is provided.

In accordance with another aspect of the invention, sulfonated aryl phosphates are produced by contacting an unsubstituted aryl phosphate with sulfur trioxide for a period sufficient to substitute a sulfonate group for at least one of the aromatic hydrogen atoms. Preferably the sulfur trioxide is utilized as a solution in an inert solvent.

The aryl phosphates which may be sulfonated in accordance with this invention are esters of phosphoric acid in which at least one of the acidic hydrogen atoms has been esterified with a phenolic compound. A particularly important group of phosphates contemplated under this invention are the sulfonated triaryl phosphates, e.g., any of the following compounds containing one or more sulfonate groups substituted for an aryl hydrogen atom: triphenyl phosphate, tricresyl phosphate, o-phenylphenyl bis (phenyl) phosphate, tris(o-phenylphenyl) phosphate, tri(2,5 - dimethylphenyl) phosphate, tri(2,6 - dimethylphenyl) phosphate, tri(3,5-dimethylphenyl) phosphate, tri(2,3,5-trimethylphenyl) phosphate, and tri(beta-naphthyl) phosphate. Also contemplated are sulfonated dialkyl monoaryl phosphates such as dimethyl monophenyl phosphate and diethyl monophenyl phosphate, and sulfonated diaryl monoalkyl phosphates such as diphenyl monomethyl phosphate and dicresyl monomethyl phosphate, and the bis phosphate of alkylene glycols and dialkylene glycols such as bis (dicresyl phosphate) of diethylene glycol. Sulfonated aryl phosphates containing at least one aryl group of multiple ring structure, e.g., phenylphenyl such as o-phenylphenyl, are preferred since these are particularly useful for improving the dyeability of shaped articles such as filaments spun from organic polymers.

The sulfonate groups in the sulfonated aryl phosphate may be in the free acid form but are preferably in the form of a salt, most suitably an alkali metal salt, e.g., of potassium or sodium, prepared by reacting the free aryl phosphate sulfonic acid with an alkali metal hydroxide or salt of a weak acid.

The sulfonated aryl phosphate of the invention generally contains from one to about six sulfonate groups, preferably from one to about three sulfonate groups for each benzene ring in the compound.

If, as is preferable, the $SO_3$ is contacted with the aryl phosphate in the form of a solution in an inert solvent, such solution generally has an $SO_3$ concentration of, for example, about 10 to 50 percent, preferably about 15 to 30 percent, based on the weight of the solvent and the sulfonation may be carried out at a temperature for example of about 0 to 80° C., preferably about 5 to 50° C.

The inert solvent used to dissolve the sulfur trioxide may be any compound inert to the sulfonation reaction and liquid at the temperature of reaction. Examples of such compounds are halogenated alkanes, e.g., containing one to 12, preferably one to 6 carbon atoms such as ethylene dichloride, trichloroethane and methylene chloride. The preferred solvent is ethylene dichloride.

The aryl phosphate may also conveniently be dissolved in or mixed with an inert solvent prior to addition of $SO_3$. Preferably this inert solvent is the same as that use to dissolve the $SO_3$.

In general, the sulfur trioxide is used in substantial excess of the number of sulfonate groups which are desired to be substituted on the aryl groups of the aryl phosphate. For example, the sulfur trioxide may be used in an amount to provide about 1 to 3 mols of $SO_3$ per mol of sulfonate groups which are desired to be substituted on the aryl phosphate. Thus, if it is desired to substitute only a single sulfonate group in each aryl phosphate molecule the amount of sulfur trioxide provided would be about 1 to 3 mols per mol of aryl phosphate. Similarly this range should be proportionally increased if it is desired to substitute more than one sulfonate group in each molecule of aryl phosphate, e.g., 2 to 6 mols of $SO_3$ per mol of aryl phosphate to prepare the disulfonate and 3 to 9 mols of $SO_3$ per mol of aryl phosphate for the trisulfonate.

In addition to the molar ratio of sulfur trioxide to aryl phosphate, the number of sulfonate groups placed on each molecule of aryl phosphate may be also effected by the temperature of reaction, and the period of reaction. Thus, in the case of triaryl phosphates, the preparation of a monosulfonate generally requires a temperature of about 20 to 60° C., and a period of reaction of about 120 to 180 minutes; to prepare a disulfonate, the temperature of reaction is about 30 to 80° C. and the period of reaction is about 180 to 240 minutes; and in the case of trisulfonate, the temperature of reaction is in the range of about 50 to 80° C., and the period of reaction is in the range of about 240 to 300 minutes.

After the sulfonation reaction, the aryl phosphate free sulfonic acid may be separated from the unreacted components of the reaction mixture by any conventional means, e.g., solvent extraction, distillation, selective crystallization, selective adsorption, etc. One very suitable method is by extraction with a suitable hydrocarbon solvent such as heptane which dissolves the unreacted aryl phosphate forming a solution or mixture which is immiscible with the phase containing the sulfonated aryl phosphate. The heptane solution may then be decantered from the phase containing the undissolved aryl phosphate free sulfonic acid which may be utilized as such or, as stated previously, added to an aqueous solution of an alkali metal salt of a weak acid or hydroxide to form the aryl phosphate alkali metal sulfonate.

The sulfonated aryl phosphates of this invention are useful in a wide variety of applications, for example, heat stabilizers and antistatic agents. However, their most important application at present are as agents for the improvement of the receptivity to disperse and basic dyes of shaped articles such as filaments prepared from organic polymers. Thus, the sulfonated aryl phosphate may be added to a spinning melt or dope, e.g., of an olefin polymer such as polypropylene, a random oxymethylene polymer, a fiber-forming aromatic polyester such as polyethylene terephthalate, a cellulose ester such as cellulose triacetate or secondary cellulose acetate, or a fiber-forming polyamide such as polyhexamethylene adipamide. The shaped article such as filaments formed from such spinning melt or dope will then have improved receptivity to disperse any basic dyes. These filaments may be used for the usual purposes, e.g., the construction of woven or knitted fabrics which are formed into apparel, home furnishings such as drapes, etc.

The following examples further illustrate the invention:

EXAMPLE I

A sample of 55 g. tris-(o-phenylphenyl) phosphate (0.1 gram mol) in 150 ml. of ethylene chloride is placed in a flask. Liquid $SO_3$ (24 g.—0.3 mol) in 80 cc. ethylene chloride (total volume 105 cc. $SO_3$ solution added) is slowly added to the mixture, which is kept at 5–10° C. and constantly stirred. During this addition, small amount of fibrous crystals are formed which were analyzed as tris(o-phenylphenyl) phosphate mono (sulfonic acid) and has a melting point of 200–205° C. After 69 minutes of reaction time, the reaction mixture is transferred into a separatory funnel and extracted with n-heptane. The bottom oil layer is added to a $K_2CO_3$ solution, followed by addition of a KCl solution. A water white crystalline solid is obtained which analysis shows to be tris-(o-phenylphenyl phosphate) mono(potassium sulfonate and which is thermally stable up to 350° C. and was soluble in acetone, a mixture of 91 wt. percent of methylene chloride and 9 wt. percent methanol and dimethyl sulfoxide.

EXAMPLE II

The procedure if Example I is repeated except that 48 g. of liquid $SO_3$ dissolved in 160 cc. of ethylene dichloride is added to the phosphate and the reaction is carried out at 40° C. for 4½ hours. The product is analyzed to be tris(o-phenylphenyl) phosphate tri(potassium sulfonate) which is thermally stable to 350° C.

EXAMPLE III

The procedure of Example I is repeated except that the aryl phosphate is 0.05 gram mol of tris(beta-naphthyl) phosphate, the $SO_3$ is added as a solution of 32 g. (0.4 mol) in 150 cc. of 1,1,2-trichloroethane and the reaction is carried out at a temperature of 10–15° C. for 2¼ hours. The product is analyzed to be tris(beta-naphthyl) phosphate penta(potassium sulfonate) and is thermally stable to 350° C.

EXAMPLE IV

The sulfonation treatment described in Example I is carried out on 0.1 gram mol of triphenyl phosphate as the aryl phospate. A product is obtained which is analyzed to be triphenyl phosphate mono(potassium sulfonate).

EXAMPLE V

The sulfonation treatment described in Example I is carried out on 0.1 gram mol of n-octylphenyl dicresyl phosphate to obtain a salt analyzed to be n-octyl phenyl discresyl phosphate mono(potassium sulfonate).

EXAMPLE VI

The procedure of Example I is repeated except that the aryl phosphate is 0.1 gram mol of tri(p-tertiary butylphenyl) phosphate to obtain a salt which is analyzed to be tri(p-tertiary butyl phenyl) phosphate mono(potassium sulfonate).

EXAMPLE VII 0.1 gram mol of tricresyl phosphate is subjected to the sulfonation treatment described in Example I to obtain a salt analyzed to be the corresponding mono(potassium sulfonate).

EXAMPLE VIII

The sulfonation treatment of Example I is carried out except that the aryl phosphate is tris-(phenanthryl) phosphate to obtain a salt analyzed to be the corresponding mono(potassium sulfonate).

The sulfonate salts obtained in Examples IV to VIII have the same properties of thermal stability and solubility as the product of Example I.

The products described in the foregoing example are analyzed for chemical structure (1) by obtaining the infra-red absorption spectrum to determine the presence of a phosphate bond; (2) by determining the percent carbon, hydrogen, phosphorus, sulfur and oxygen using standard analytic procedures to determine whether the structure of the initial aryl phosphate is still intact and the probable number of sulfonic groups substituted; and (3) by reacting free sulfonic acid form of the sulfonated aryl phosphate with $PCl_5$ and then with ammonia (which forms sulfonamide groups from sulfonic acid (and then analyzing the compound to determine whether equimolar proportions of sulfur and nitrogen are present, which indicates the presence of sulfonic acid groups in the $SO_3$ reacted compound.

It is to be understood that the foregoing detailed description is given merely by way of illustration and that many variations may be made therein without departing from the spirit of our invention.

The embodiments of the invention in which an exclusive property or privilege is claimed are defined as follows:

1. A sulfonated aryl phosphate selected from the group consisting of sulfonated tris-(o-phenylphenyl) phosphate, sulfonated tris-(phenanthryl) phosphate and sulfonated o-phenylphenyl bis(phenyl) phosphate.

2. Sulfonated tris-(o-phenylphenyl) phosphate.

3. Sulfonated tris-(phenanthryl) phosphate.

4. Sulfonated o-phenylphenyl bis(phenyl) phosphate.

5. A triaryl phosphate alkali metal sulfonate selected from the group consisting of tris-(o-phenylphenyl) phosphate alkali metal sulfonate, tris-(phenanthryl) phosphate alkali metal sulfonate and o-phenylphenyl bis(phenyl) phosphate alkali metal sulfonate.

6. A process comprising contacting triaryl phosphate with a solution of about 10 to 50 percent by weight of sulfur trioxide in a halogenated alkane based on the weight of the solvent substituting a sulfonate for at least one of the aromatic hydrogen atoms of said aryl phosphate, to obtain triaryl phosphate free sulfonic acid, separating said sulfonic acid from the unreacted components, contacting said triaryl phosphate free sulfonic acid with an aqueous solution of an alkali metal salt of a weak acid or alkali metal hydroxide to obtain triaryl phosphate alkali metal sulfonate and separating said alkali metal sulfonate.

7. The process of claim 6 wherein said halogenated alkane is ethylene dichloride.

8. The process of claim 5 wherein the sulfur trioxide solution comprises from about 15 to about 30 weight percent of sulfur trioxide based on the weight of the solvent.

9. The process of claim 6 wherein the aryl phosphate is contacted with the sulfur trioxide solution at a temperature of from about 0 degrees to about 80 degrees centigrade.

10. The process of claim 6 wherein said process comprises contacting the triaryl phosphate with a solution of sulfur trioxide in a halogenated alkane, said solution comprising from about 10 to about 50 weight percent of sulfur trioxide, reacting said triaryl phosphate and said sulfur trioxide at a temperature of from about 20 degrees to about 80 degrees centigrade for a period of time from about 120 minutes to about 300 minutes.

11. A process of producing sulfonated aryl phosphate comprising contacting aryl phosphate with a solution of sulfur trioxide in a halogenated alkane, said solution comprising from about 10 to about 50 weight percent of sulfur trioxide, reacting said aryl phosphate and said sulfur trioxide at a temperature of from about 0 degrees to about 80 degrees centigrade and substituting a sulfonate for at least one of the aromatic hydrogen atoms of said aryl phosphate to thereby obtain said sulfonated aryl phosphate.

12. The process of claim 11 wherein the sulfur trioxide is present in substantial excess of the number of sulfonate groups which are desired to be substituted on the aryl groups of the aryl phosphate.

References Cited

UNITED STATES PATENTS

| 2,694,084 | 11/1954 | Brugmann | 260—920 |
| 3,206,492 | 9/1965 | Turbak et al. | 260—974 |
| 2,071,354 | 2/1937 | Morgan | 260—947UX |
| 3,072,618 | 1/1963 | Turbak | 260—686X |
| 3,206,492 | 9/1965 | Turbak et al. | 260—947UX |

CHARLES B. PARKER, Primary Examiner

A. H. SUTTO, Assistant Examiner

U.S. Cl. X.R.

260—30.6, 45.95, 686, 947